United States Patent
Terada

(10) Patent No.: US 10,550,495 B2
(45) Date of Patent: *Feb. 4, 2020

(54) POLYLACTIC ACID RESIN FIBER, POLYLACTIC ACID LONG FIBER, POLYLACTIC ACID SHORT FIBER, AND POLYLACTIC ACID FIBER

(71) Applicant: BIOWORKS CORPORATION, Shibuya-ku, Tokyo (JP)

(72) Inventor: Takahiko Terada, Tokyo (JP)

(73) Assignee: BIOWORKS CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,345

(22) Filed: Jun. 8, 2018

(65) Prior Publication Data

US 2018/0291532 A1  Oct. 11, 2018

Related U.S. Application Data

(63) Continuation of application No. PCT/JP2016/086517, filed on Dec. 8, 2016.

(30) Foreign Application Priority Data

Dec. 8, 2015 (JP) .................................. 2015-239689

(51) Int. Cl.

| | |
|---|---|
| *D01F 6/92* | (2006.01) |
| *C08K 5/06* | (2006.01) |
| *C08K 5/10* | (2006.01) |
| *C08K 5/20* | (2006.01) |
| *D02J 1/22* | (2006.01) |
| *C08L 67/04* | (2006.01) |
| *C08L 71/02* | (2006.01) |
| *D01D 5/098* | (2006.01) |
| *D01F 1/10* | (2006.01) |
| *D06P 1/34* | (2006.01) |
| *D06P 3/52* | (2006.01) |
| *C08K 5/00* | (2006.01) |
| *D01F 6/62* | (2006.01) |
| *C08L 101/16* | (2006.01) |

(52) U.S. Cl.
CPC .............. *D01F 6/92* (2013.01); *C08K 5/0016* (2013.01); *C08K 5/06* (2013.01); *C08K 5/10* (2013.01); *C08K 5/20* (2013.01); *C08L 67/04* (2013.01); *C08L 71/02* (2013.01); *C08L 101/16* (2013.01); *D01D 5/098* (2013.01); *D01F 1/10* (2013.01); *D01F 6/62* (2013.01); *D02J 1/22* (2013.01); *D06P 1/34* (2013.01); *D06P 3/52* (2013.01); *D10B 2401/046* (2013.01); *D10B 2401/061* (2013.01); *D10B 2401/063* (2013.01); *D10B 2401/12* (2013.01)

(58) Field of Classification Search
CPC .... D01F 6/92; D01F 6/62; C08K 5/06; C08K 5/10; C08K 5/20; D02J 1/22; C08L 67/04; C08L 71/02; D01D 5/098; D06P 1/34; D06P 3/52; D10B 2401/046; D10B 2401/061; D10B 2401/063; D10B 2401/12

See application file for complete search history.

(56) References Cited

U.S. PATENT DOCUMENTS

| | | | |
|---|---|---|---|
| 2003/0034587 A1* | 2/2003 | Suzuki ...................... | B29B 9/14 264/235 |
| 2008/0119584 A1 | 5/2008 | Nemoto et al. | |
| 2010/0130699 A1 | 5/2010 | Ikegame et al. | |
| 2015/0086768 A1 | 3/2015 | Hashimoto et al. | |
| 2015/0087560 A1* | 3/2015 | Abe .......................... | C09K 8/12 507/102 |

FOREIGN PATENT DOCUMENTS

| | | | |
|---|---|---|---|
| JP | 2002-285438 | 10/2002 | |
| JP | 2003-327803 | 11/2003 | |
| JP | 2003-328779 | 11/2003 | |
| JP | 2005-246718 | 9/2005 | |
| JP | 2005-273106 | 10/2005 | |
| JP | 2010-84261 | 4/2010 | |
| JP | 2011-256494 | 12/2011 | |
| JP | 2012-7257 | 1/2012 | |
| WO | WO2013/161754 | * 10/2013 | ............... C09K 8/38 |
| WO | 2013/179801 | 12/2013 | |

OTHER PUBLICATIONS

International Search Report dated Mar. 14, 2017 in International (PCT) Application No. PCT/JP2016/086517, with English translation.

International Preliminary Report on Patentability dated Jun. 12, 2018 in International (PCT) Application No. PCT/JP2016/086517, with English translation.

Extended European Search Report, dated Jun. 19, 2019 in corresponding European patent application No. 16873062.0.

\* cited by examiner

*Primary Examiner* — Amina S Khan

(74) *Attorney, Agent, or Firm* — Wenderoth, Lind & Ponack, L.L.P.

(57) ABSTRACT

A polylactic acid resin fiber is obtained by melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C), wherein the following conditions (a) and (b) are satisfied:

(a) the stretch recovery rate is 5 percent or less; and
(b) the degree of crystallinity measured by a differential scanning calorimeter is 50 to 70 percent.

14 Claims, No Drawings

POLYLACTIC ACID RESIN FIBER, POLYLACTIC ACID LONG FIBER, POLYLACTIC ACID SHORT FIBER, AND POLYLACTIC ACID FIBER

CROSS-REFERENCE TO RELATED APPLICATIONS

This application is based upon and claims the benefit of priority from the prior Japanese Patent Application No. 2015-239689, filed on Dec. 8, 2015 and International Patent Application No. PCT/JP2016/086517, filed on Dec. 8, 2016, the entire content of each of which is incorporated herein by reference.

BACKGROUND OF THE INVENTION

1. Field of the Invention

The present invention relates to fibers formed of a polylactic acid resin composition. More specifically, the present invention relates to fibers formed of a polylactic acid resin having high crystallinity and a low stretch recovery rate.

2. Description of the Related Art

Synthetic fibers have many practical properties such as strength, dimensional stability, durability, and the like that are superior to those of natural fibers and are industrial products manufactured through a controlled process. Therefore, for a reason that stability in quality can be ensured, etc., mass production of synthetic fibers has started with the development of the petrochemical industry and accounts for about 60 percent of the amount of fiber production in the world. The most widely used synthetic fibers are polyester fibers represented by polyethylene terephthalate, nylon fibers represented by 6 nylon and 6, 6-nylon, acrylic fibers, and the like. Synthetic resins have the advantage of being able to be manufactured in a large amount and at a low cost. On the other hand, regarding the discarding after use, etc., synthetic resins are hardly decomposed in the natural environment, and there are problems such as the discharging of carbon dioxide when burned and the production of high combustion heat.

For these reasons, the use of polylactic acid, which is a synthetic resin that has biodegradability and whose material is plant-derived, for fibers has been under consideration. Polylactic acid is a semi-crystalline polymeric material in which a crystalline portion and a non-crystalline portion coexist. However, since crystal solidification and the solidification of non-crystalline parts when cooled down from a molten state are very slow, there has been a problem that a yarn that is obtained is unstable, e.g., having poor operability due to the tendency of yarn breakage to occur at a section heated with a heater, inconsistency in yarn quality, and the like. As described, there has been a problem that process passability is poor during the manufacturing process such as spinning, drawing, and the like, resulting in low productivity.

Concerning this, attempts have been made to increase the heat resistance of polylactic acid fibers and improve the process passability by adding a crystal nucleating agent to polylactic acid so as to promote crystallization. For example, an example where an inorganic filler is added as a crystal nucleating agent is described in Patent document No. 1 or Patent document No. 2. However, the fiber strength was extremely low, and no practical polylactic acid fiber was able to be obtained.

Additionally, in order to provide excellent thermal dimensional stability to polylactic acid fibers, a decrease in the stretch recovery rate is required. Patent document No. 3 discloses a method of achieving a stretch recovery rate of 18-50% for a false-twisted yarn in which polylactic acid fibers are used. However, a design is employed where elasticity is also achieved, and no technique is disclosed for decreasing a stretch recovery rate while focusing on thermal dimensional stability.

[Patent document No. 1] JP 2003-327803
[Patent document No. 2] JP 2003-328779
[Patent Document No. 3] JP 2002-285438

SUMMARY OF THE INVENTION

In this background, a purpose of the present invention is to provide a polylactic acid resin fiber having a good degree of crystallinity and an excellent stretch recovery rate.

To solve the problem above, the inventors of the present invention have found that, in a means for obtaining a polylactic acid resin fiber by melt-spinning a poly-L-lactic acid resin combined with a specific plasticizer and a specific lubricant, a polylactic acid resin fiber with a high degree of crystallinity, a low stretch recovery rate, and excellent thermal dimensional stability can be achieved by controlling the optical purity of L-lactic acid in the poly-L-lactic acid, the blending amount of the plasticizer and the lubricant, and heating temperature to be under conditions of the properties. This means allows rapid crystallization to occur during a cooling process after melting. Rearrangement and recrystallization of a crystal occur by further performing drawing under a temperature condition, and a high degree of crystallinity with the expression of high heat resistance while maintaining a sufficiently low stretch recovery rate can be achieved by further performing heat fixation at high temperature. The present invention has been completed based on these findings. The present invention is as shown in the following.

That is, a polylactic acid resin fiber according to a first embodiment of the present invention is a polylactic acid resin fiber obtained by melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C), wherein the following conditions (a) and (b) are satisfied: (a) the stretch recovery rate is 5 percent or less; and (b) the degree of crystallinity measured by a differential scanning calorimeter is 50 to 70 percent.

A polylactic acid resin composition according to a second embodiment of the present invention is a polylactic acid resin fiber obtained by melt-spinning a mixture containing 100 parts by weight of a poly-L-lactic acid (A) having an L-lactic acid purity of 98 to 99 mol percent, 3 to 10 parts by weight of a plasticizer (B), and 0.3 to 1.0 parts by weight of a lubricant (C), wherein the following conditions (c) and (d) are satisfied: (c) the stretch recovery rate is 5 percent or less; and (d) the degree of crystallinity measured by a differential scanning calorimeter is 40 to 60 percent.

DETAILED DESCRIPTION OF THE INVENTION

A polylactic acid resin fiber according to an embodiment of the present invention is explained in detail in the following. The composition described below is by way of example only and does not limit the scope of the present invention.

A polylactic acid resin fiber according to a first embodiment of the present invention is a polylactic acid resin fiber obtained by melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C), wherein the following conditions (a) and (b) are satisfied: (a) the stretch recovery rate is 5 percent or less; and (b) the degree of crystallinity measured by a differential scanning calorimeter is 50 to 70 percent.

A polylactic acid resin composition according to a second embodiment of the present invention is a polylactic acid resin fiber obtained by melt-spinning a mixture containing 100 parts by weight of a poly-L-lactic acid (A) having an L-lactic acid purity of 98 to 99 mol percent, 3 to 10 parts by weight of a plasticizer (B), and 0.3 to 1.0 parts by weight of a lubricant (C), wherein the following conditions (c) and (d) are satisfied: (c) the stretch recovery rate is 5 percent or less; and (d) the degree of crystallinity measured by a differential scanning calorimeter is 40 to 60 percent.

In the above-stated polylactic acid resin composition according to the second embodiment, regarding crystal melting peaks measured by the differential scanning calorimeter, two or more crystal melting peaks are preferably observed, and a melting peak of 160 degrees Celsius or below is preferably included.

Also, in a polylactic acid resin fiber according to each of the above-stated embodiments, melt-spinning is preferably performed by a direct spinning and drawing method, and the heat fixation temperature after hot drawing is preferably 130 to 160 degrees Celsius.

Further, in a polylactic acid resin fiber according to each of the above-stated embodiments, melt-spinning is preferably performed by a direct spinning and drawing method, spinning is preferably performed at 200 to 250 degrees Celsius, drawing is preferably performed at 70 to 130 degrees Celsius and at a draw ratio of 2 to 10, and heat treatment is preferably performed at 130 to 160 degrees Celsius.

Also, in a polylactic acid resin fiber according to each of the above-stated embodiments, the plasticizer (B) is preferably at least one compound selected from a group consisting of polyethylene glycol, a castor oil-based fatty acid ester, a polyoxyethylene sorbitan fatty acid ester, and a polyethylene glycol fatty acid ester or a mixture thereof.

Further, in a polylactic acid resin fiber according to each of the above-stated embodiments, the molecular weight of a polyethylene glycol is preferably 200 to 9500.

Also, in a polylactic acid resin fiber according to each of the above-stated embodiments, the lubricant (C) is preferably at least one compound selected from a group consisting of ethylene-bis-hydroxy stearic acid amide, N-stearyl erucic acid amide, N-stearyl stearic acid amide, ethylene-bis-stearic acid amide, and stearic acid amide or a mixture thereof.

Further, a polylactic acid resin composition according to each of the above-stated embodiments preferably satisfies a condition where the moisture percentage is 1 to 5 percent.

Also, in a polylactic acid resin fiber according to each of the above-stated embodiments, a condensed polylactic acid resin composition (D) obtained by kneading a total of 25 to 100 parts by weight of the plasticizer (B) and the lubricant (C) based on 100 parts by weight of the poly-L-lactic acid (A) is preferably prepared and provided in advance in order to prepare the mixture containing the poly-L-lactic acid (A), the plasticizer (B), and the lubricant (C).

Preferably, the above-stated condensed polylactic acid resin composition (D) further contains poly-L-lactic acid having an L-lactic acid purity of 98 mol percent or less.

Also, a polylactic acid resin fiber according to each of the above-stated embodiments is preferably a polylactic acid long fiber or a polylactic acid short fiber. Further, a polylactic acid resin fiber according to each of the above-stated embodiments is preferably dyed using natural dyes.

[Polylactic Acid]

A poly-L-lactic acid used in the present embodiment is a polymer having L-lactic acid as a main constituting component. A poly-L-lactic acid contains D-lactic acid, which is an optical isomer of L-lactic acid. However, regarding poly-L-lactic acid in a first polylactic acid resin fiber according to the present embodiment, the content ratio of L-lactic acid units in the entire lactic acid components of a polylactic acid polymer is 99 mol percent or more. Also, for poly-L-lactic acid in a second polylactic acid resin fiber according to the present embodiment, poly-L-lactic acid whose L-lactic acid unit content ratio in the entire lactic acid components of a polylactic acid polymer is 98 mol percent or more and less than 99 mol percent is used.

The poly-L-lactic acid used in the present embodiment may contain monomers other than lactic acid. However, since the crystallinity is significantly inhibited when other monomers are contained, the copolymerization amount of other monomers is preferably 0 to 3 mol percent and is even more preferably 0 to 2 mol percent with respect to the entire poly-L-lactic acid based monomers.

For other monomers, glycols such as ethylene glycol, propylene glycol, butanediol, heptanediol, hexanediol, octanediol, nonanediol, decanediol, neopentylglycol, glycerin, pentaerythritol, bisphenol A, polyethyleneglycol, polypropylene glycol, polytetramethylene glycol, etc., dicarboxylic acid such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, 4,4'-diphenyl ether dicarboxylic acid, etc., hydroxy carboxylic acid such as glycolic acid, hydroxypropionic acid, hydroxybutyric acid, hydroxyvaleric acid, hydroxycaproic acid, hydroxybenzoic acid, etc., and lactones such as caprolactone, valerolactone, propiolactone, undecalactone, etc., can be used.

Considering practical productivity and physical properties, the weight-average molecular weight of the poly-L-lactic acid used in the present embodiment is preferably 50,000 to 500,000 and is more preferably 100,000 to 250,000. The weight-average molecular weight used here means a molecular weight obtained through measurement in a chloroform solvent by gel permeation chromatography (GPC), followed by calculation using polystyrene conversion.

Also, the polylactic acid resin fiber according to the present embodiment may contain resins other than poly-L-lactic acid. The contained amount thereof is preferably 0 to 70 percent by mass, more preferably 0 to 50 percent by mass, and even more preferably 0 to 30 percent by mass based on the total mass.

As a resin other than poly-L-lactic acid, for example, a thermoplastic resin such as poly-D-lactic acid, polyethylene, polypropylene, polyamide, polyacrylate, polymethacrylate, polyester, polyacetal, polyphenylene sulfide, polyether ether ketone, polysulfone, polyphenylene oxide, polyimide, polyetherimide, or the like or a thermosetting resin such as a phenol resin, a melamine resin, a polyester resin, a silicone resin, an epoxy resin, or the like is used.

Regarding a polylactic acid resin composition according to the present embodiment, the amount of low-molecular lactic acid components such as lactide, etc., contained in the resin composition is preferably 0 to 0.5 percent by mass. More preferably, the amount is 0 to 0.3 percent by mass. If the amount exceeds 0.5 percent by mass, there is a concern that not only the transparency of the polylactic acid resin composition is adversely affected but also hydrolysis of a poly-L-lactic acid resin is progressed over time resulting in a decrease in strength and other properties.

[Plasticizer]

In addition to facilitating the processing of a polylactic acid resin fiber, a plasticizer used in the present embodiment can add flexibility. These advantages are phenomena caused by an increase in the glass-transition temperature and the mobility of molecular chains due to the addition of the plasticizer. The plasticizer that has been added gets in between polylactic acid polymer chains, causing the association of a polar portion of the plasticizer with a polar portion of a polymer and blocking the polar portion of the polymer. Then, the interaction between polymers, which prevents micro-Brownian motion of the polymer chains, is replaced with the interaction between a polymer and the plasticizer, reducing the interaction between the polymer chains. This increases the distance between the molecular chains and causes disentanglement of the entanglement, resulting in an increase in the mobility of the molecular chains. Due to the advantages of the plasticizer, the molecular mobility is increased, allowing for the crystallization of the poly-L-lactic acid at a lower temperature. Therefore, the crystallization can be promptly achieved at the time of the cooling during a melt-spinning process or a subsequent heating process.

As a result of intensive study by the present inventors, the blending amount of the plasticizer is preferably 3 to 10 parts by weight based on 100 parts by weight of the poly-L-lactic acid. The blending amount of less than 3 parts by weight has a small effect in increasing the molecular mobility of the poly-L-lactic acid, and practical crystallization speed cannot be obtained at a low temperature or during a rapid cooling process. Also, since the plasticization effect is small, the polylactic acid resin fiber is hard and fragile and cannot be used practically due to, e.g., yarn breakage during the manufacturing or during the use. When the blending amount exceeds 10 parts by weight, the plasticizer becomes incorporated into the crystal in addition to the blocking of the association of poly-L-lactic acid molecules and the disentanglement of the entanglement. Thus, the plasticizer rather inhibits the crystallization. Further, there is an increased concern that the plasticizer can no longer become completely dissolved in the polylactic acid resin composition due to the crystallization causing leaching from the poly-lactic acid resin composition (a bleeding phenomenon).

Among these, the plasticizer (B) is further preferably at least one compound selected from a group consisting of a polyethylene glycol, a castor oil-based fatty acid ester, a polyoxyethylene sorbitan fatty acid ester, and a polyethylene glycol fatty acid ester or a mixture thereof. These compounds are particularly excellent in the compatibility with poly-L-lactic acid and do not become opacified or leach even when the polylactic acid resin fiber is cooled down from a molten state and then heated resulting in a change in the degree of crystallinity of the polylactic acid resin fiber and thus resulting in a change in the existence ratio of the non-crystalline parts and the crystalline parts. Thus, these compounds are used as more preferred plasticizers.

Further, these plasticizers have good compatibility with one another and can be added alone or in combination of two or more to the poly-L-lactic acid.

Further, the plasticizer (B) is preferably polyethylene glycol having a molecular weight of 200 to 9,500. As a result of intensive study by the present inventors, the molecular weight of less than 200 has a small effect in increasing the molecular mobility of the poly-L-lactic acid, and practical crystallization speed cannot be obtained at a low temperature or during the rapid cooling process. Also, since the plasticization effect is small, the polylactic acid resin fiber is hard and fragile and cannot be used practically due to, e.g., yarn breakage during the manufacturing or during the use. When the molecular weight exceeds 9,500, the plasticizer becomes incorporated into the crystal in addition to the blocking of the association of poly-L-lactic acid molecules and the disentanglement of the entanglement. Thus, the plasticizer rather inhibits the crystallization. Further, there is an increased concern that the plasticizer can no longer become completely dissolved in the polylactic acid resin composition due to the crystallization causing leaching from the polylactic acid resin composition (a bleeding phenomenon).

[Lubricant]

In addition to improving the releasability at the time of a forming process of the polylactic acid resin fiber by serving as an external lubricant, a lubricant used in the present embodiment can improve slippage of molecules by serving as an internal lubricant and improve the mobility of the molecular chains including the disentanglement of molecular entanglement. In the polylactic acid resin composition supplied for the spinning, these molecules are entangled in a coil shape in a molten state and become untangled during melt flow and/or in the course of taking up spun yarn and drawn out to some extent. However, under a normal spinning condition, this is still insufficient. Accordingly, the polylactic acid resin composition containing the lubricant has the effect of further untangling the entanglement and becoming further drawn out. Furthermore, due to the advantages of the lubricant, the molecular mobility is increased, allowing for the crystallization of the poly-L-lactic acid at a lower temperature.

When the poly-L-lactic acid is rapidly cooled down to a certain temperature from a molten state and crystallization treatment is performed in a quiescent state, a crystalline structure that is formed is a lamellar structure (folded chain crystal). At that time, the temperature under which the crystallization treatment is performed is the most basic and important factor in the high-order structure formation of a polymer. In other words, it is known that the thickness of a crystal increases as the crystallization temperature increases, and a crystal with a smaller lamellar thickness is formed when crystallization occurs at a lower temperature. Also, crystallization at a low temperature can result in a disorder-type crystal where the crystalline structure of lactic acid is slightly disordered. Based on these facts, the mobility of the molecular chains is increased by the lubricant, allowing for crystallization in a lower temperature range; thereby, the distribution of the thickness of the crystal and the distribution of the disorder in the crystalline structure are more widened, and a fiber having flexible extensibility can be formed while the polylactic acid resin fiber has high crystallinity and heat resistance.

Also, the lubricant used in the present embodiment, by serving as an internal lubricant, exhibits a nucleation memory effect where shear heat generation during, e.g., kneading at the time of mixing the polylactic acid resin fiber is suppressed and a crystalline nucleus that has existed in the poly-L-lactic acid since before the kneading is kept without being melted. Thus, the lubricant is more effective in promoting the crystallization of the poly-L-lactic acid.

As a result of intensive study by the present inventors, it has been found that the lubricant exhibits a great effect when used with the plasticizer compared to when used alone. In the case of being used with the plasticizer, the blending amount of the lubricant is preferably 0.3 parts by weight or more based on 100 parts by weight of the poly-L-lactic acid. The blending amount of less than 0.3 parts by weight has a small effect, as the internal lubricant, on the poly-L-lactic acid in increasing the molecular mobility, and practical crystallization speed cannot be obtained in a temperature range where a thin lamellar is formed. Also, the amount of the lubricant is preferably 1.0 parts by weight or less. When the amount exceeds this range, the flexibility of the polylactic acid resin fiber is reduced, and practical extensibility cannot be obtained.

The lubricant is preferably at least one compound selected from a group consisting of an ethylene-bis-hydroxy stearic acid amide, an N-stearyl erucic acid amide, an N-stearyl stearic acid amide, an ethylene-bis-stearic acid amide, and a stearic acid amide or a mixture thereof. These compounds increase the molecular chain mobility of the poly-L-lactic acid by serving as internal lubricants while maintaining the high compatibility of the polylactic acid resin composition and contribute to speedy crystallization. Further, these lubricants have good compatibility with one another and can be added alone or in combination of two or more to the poly-L-lactic acid.

[Other Additives]

The polylactic acid resin fiber according to the present embodiment can contain hydrolysis inhibitors, antioxidants, antistatics, light stabilizers, ultraviolet light absorbers, pigments, antibacterial agents, fungicides, foaming agents, flame retardants, and the like in addition to the plasticizer and the lubricant according to the present embodiment in a range that does not disturb the crystallinity and the thermal dimensional stability, which are the purposes of the present invention. For example, the hydrolysis inhibitors include carbodiimide compounds such as polycarbodiimide compounds and include polycarbodiimide compounds obtained by the reaction of monocarbodiimide such as dicyclohexylcarbodiimide or diisopropylcarbodiimide with organic diisocyanate. The contained amount of the hydrolysis inhibitors is preferably 0.05 to 3 parts by weight and more preferably 0.01 to 2 parts by weight based on 100 parts by weight of the polylactic acid resin fiber.

[Method for Mixing Polylactic Acid Resin Fiber]

For the polylactic acid resin fiber according to the present invention, it is necessary to first mix the poly-L-lactic acid (A), the plasticizer (B), and the lubricant (C). For the mixing of the components, a publicly-known or publicly-used method or a kneading technology can be applied. For example, when extruding, kneading, and pelletizing the poly-L-lactic acid (A) that is in a powder form or a pellet form using a twin-screw extrusion kneading machine, the extrusion, kneading, and pelletization can be achieved by adding the plasticizer (B) and the lubricant (C), applying heat and shear, and performing mixing. Regarding the supplying to the twin-screw extrusion kneading machine, the plasticizer (B) and the lubricant (C) can be fed at the same time the poly-L-lactic acid is fed or the supplying can be done by side feeding or using a liquid injecting pump as necessary. Although it depends on the number of rotations of a screw, the heating temperature of the twin-screw extrusion kneading machine is preferably 140 to 240 degrees Celsius. When the heating temperature is under 140 degrees Celsius, the mixing becomes insufficient. When the heating temperature exceeds 240 degrees Celsius, the thermal decomposition of the poly-L-lactic acid occurs. Also, the number of rotations of the screw is preferably 100 to 500 rpm. When the number of rotations is under 100 rpm, the mixing becomes insufficient. When the number of rotations exceeds 500 rpm, the thermal decomposition of the poly-L-lactic acid occurs.

Besides the twin-screw extrusion kneading machine, the mixing can be achieved by a technique where, e.g., pelletization is performed by an extruder after batch kneading performed by a batch-type kneader, a kneader-ruder, or a kneader. Also, it is also possible to extrude and pelletize, after the poly-L-lactic acid, the plasticizer (B), and the lubricant (C) are collectively mixed by a blender or the like, the composition while heat-melting the composition by a twin-screw extruder.

In addition to mixing the poly-L-lactic acid (A), the plasticizer (B), and the lubricant (C) in specified concentrations, manufacturing is also possible by manufacturing a polylactic acid resin composition (D) that is obtained by mixing the plasticizer (B) and the lubricant (C) with the poly-L-lactic acid (A) in a high concentration and then dry-blending the polylactic acid resin composition (D) in the poly-L-lactic acid (A) or diluting the polylactic acid resin composition (D) by heating, extruding, and kneading or the like.

When the plasticizer (B) and the lubricant (C) are added to form the polylactic acid resin composition (D), the mixing may be performed for each of the additives, or the two kinds of additives may be mixed at the same time. Also, the ratio for the mixing in the polylactic acid resin composition (D) is preferably a total of 25 to 100 parts by weight of the plasticizer (B) and the lubricant (C) based on 100 parts by weight of the poly-L-lactic acid (A).

Also, since the polylactic acid resin composition (D) is more condensed compared to the respective specified concentrations of the plasticizer (B) and the lubricant (C) in the polylactic acid resin composition according to the present embodiment, there is a concern that the plasticizer (B) and the lubricant (C) bleed, for example, when the polylactic acid resin composition (D) is heated during a drying process or the like resulting in the poly-L-lactic acid having a high degree of crystallinity. In that case, the polylactic acid resin composition (D) containing not only poly-L-lactic acid whose L-lactic acid purity is 98 mol percent to 99 mole percent or 99 mol percent or more but also poly-L-lactic acid whose L-lactic acid purity is less than 98 mol percent allows non-crystalline poly-L-lactic acid having higher compatibility to be increased, suppressing the bleeding of the plasticizer (B) and the lubricant (C). Therefore, preferably, the condensed polylactic acid resin composition (D) further contains poly-L-lactic acid having an L-lactic acid purity of less than 98 mol percent.

Regarding the blending ratio of the polylactic acid resin composition (D) and the poly-L-lactic acid (A), the weight ratio of the polylactic acid resin composition (D) over the poly-L-lactic acid (A) is 1/3 to 1/20, preferably 1/5 to 1/20, and more preferably 1/10 to 1/20.

[Method for Manufacturing Polylactic Acid Resin Fiber]

A method for obtaining the polylactic acid resin fiber according to the present embodiment is not particularly limited, and a technique such as wet spinning, dry spinning, melt spinning, or the like can be used. However, a melt spinning method that allows a high-quality fiber to be obtained at a low cost is preferred.

In the melt spinning method, the polylactic acid resin composition is melted by a heating extruder and supplied to a spinning device. In the case of poly-L-lactic acid, there is a concern that containing moisture can cause deterioration due to hydrolysis at the time of heating. Thus, the polylactic acid resin composition to be supplied to the heating extruder is preferably dried so as to reduce the moisture content.

Also, a spinneret having small holes (nozzles) for discharging poly-L-lactic acid is preferably loaded in a pack incorporating a filter for filtering foreign objects. There are approximately several to a hundred nozzles per spinneret depending on the thickness of a yarn, and several tens of independent spinnerets and packs are placed in parallel for each spinning machine. Further, a pump for weighing high-viscosity polymers under a high temperature and a high pressure by the rotation of a gear pump is connected to each spinneret, and the polylactic acid resin composition is discharged in a fiber shape while strictly controlling the discharge amount.

A polylactic acid resin fiber that has been discharged is cooled and solidified inside a spinning tube. The cooling can be done by blowing cooling air to the fiber perpendicularly from one direction or by blowing cooling air from a circumferential direction down to the downstream side along with the fiber in a parallel fashion.

The polylactic acid resin fiber that has been cooled and solidified is moistened by an oil agent and wound continuously by a winder via a roller, which is called a godet roller, for taking up the fiber at a constant speed. A yarn that has been spun and wound is an undrawn yarn. The oil agent is important in order to ensure the stability of the handling operation in a spinning process.

In a molten state where the polylactic acid resin composition is supplied for the spinning, poly-L-lactic acid molecules are entangled in a coil shape and become untangled during melt flow and/or in the course of taking up the spun yarn and drawn out to some extent. However, under a normal spinning condition, this is still insufficient. In the polylactic acid resin fiber according to the present invention, due to the effects of the plasticizer and the lubricant, the molecular mobility is increased, the entanglement is further untangled, and the fiber becomes drawn out. In order to orient the molecules in a fiber axis direction so as to further increase the strength and the like, a drawing process is preferably added. Crystallization partially occurs due to the drawing and heat treatment at the time of the drawing, and the heat resistance is increased as well as suppressing the slippage between the molecules due to the binding force of a crystal. Thus, thermal stabilization can be achieved. An undrawn polylactic acid resin fiber is drawn at a ratio that corresponds to the speed ratio of a feed roller to a taking-up (drawing) roller in the drawing machine.

In order for the polylactic acid resin fiber to not slip, the fiber is wound around these rollers multiple times. Further, the rotation axis of an accompanying small-diameter roller and the rotation axis of the drawing roller preferably have an angle therebetween such that a yarn that has gone around the rollers do not overlap at the same position.

Also, a heating plate is preferably provided in the middle so as to perform heat treatment on the fiber, promote crystallization, fix the structure, and adjust the percentage of contraction and the like.

Instead of the heating plate, a heating roller can be used for the taking-up roller.

In addition to a so-called two-step method that is described above where an undrawn yarn is wound once and then moves to a drawing process, the polylactic acid resin fiber according to the present embodiment may be manufactured by a direct spinning drawing method where a spun fiber is directly drawn. In this process, a spun fiber is directly drawn, and the spun fiber is thus drawn without having enough time for strain on the polymer chains applied at the time of the spinning to be relaxed, resulting in a drawn yarn having properties that are slightly different from those obtained by the two-step method. In this method, winding is necessary at high speed obtained by multiplying a spinning speed by a draw ratio. Therefore, a high-speed winder with a winding speed of 3000 m/min to 4000 m/min is used.

Although the optimal temperature for the spinning temperature in the spinning process varies depending of the viscosity of the polylactic acid resin composition, the spinning temperature is preferably 200 degrees Celsius to 250 degrees Celsius. Within this range, a good spun yarn can be achieved with little decrease in the viscosity at the time of the spinning.

The heating temperature in the drawing process is preferably 70 to 130 degrees Celsius. Below 70 degrees Celsius, the crystallization speed is low, and the heating has a little contribution to an increase in the degree of crystallinity. Thus, since only partial crystallization due to the drawing occurs, the degree of crystallinity that is enough to develop heat resistance cannot be achieved. Above 130 degrees Celsius, the softening of a crystalline portion is drastic, and, e.g., yarn breakage is caused. Thus, a good spun yarn cannot be achieved.

Further, the draw ratio is preferably 2 to 10. When the draw ratio is less than 2, the drawing has a little contribution to an increase in the crystallization, and the degree of crystallinity that is enough to develop heat resistance thus cannot be achieved. Also, the disentanglement of the entanglement of poly-L-lactic acid molecules is not sufficient, and, e.g., yarn breakage is caused. Thus, a good spun yarn cannot be achieved. When the draw ratio is 10 or more, the deformation of the fiber is too large, and the drawing is likely to become uneven.

The drawing process can be performed in stages other than one stage. For example, the temperature is heated to 80 degrees Celsius followed by drawing to 2 to 3 times in a first stage, and the temperature is heated to 120 degrees Celsius followed by drawing to 2 to 3 times in a second stage. Together, this allows for drawing to 4 to 9 times the size. In this case, since the degree of crystallinity is increased by the drawing in the first stage, the drawing temperature in the second stage is preferably higher than that in the first stage.

Also, a heat-fixation process by heating is preferably provided after the drawing process. Due to the heating and the drawing in the drawing process, the entangled poly-L-lactic acid molecules are untangled and drawn out, and the degree of crystallinity is increased as well. Due to the heat fixation after the drawing process, the polylactic acid resin fiber is cooled down, and, even when the tension applied to the fiber is released, the arrangement and crystallization of the molecules is fixed, and the heat resistance and the thermal dimensional stability can be developed.

[Stretch Recovery Rate of Polylactic Acid Resin Fiber]

The stretch recovery rate of the polylactic acid resin fiber according to the present embodiment is preferably 5 percent or less. The stretch recovery rate shows the shape restorability of a crimp in hot water. The smaller this value is, the higher the shape restorability of a crimp that has been stretched becomes. By keeping the stretch recovery rate to be 5 percent or less, a fiber that is dimensionally stable with little dimensional change caused due to an environment can be provided. When the stretch recovery rate is 5 percent or less, a fiber can be obtained that feels slightly hard due to low bulkiness when the fiber is knitted into lace or made into a narrow ribbon but has a characteristic crisp feeling. A crisp feeling is also called a crisp touch and expresses the feeling of crispness of a fabric or the like when touched with hands and is a tactile impression that is required for summer clothes fabrics. In general, in order to provide a crisp feeling to a fabric, a technique is employed, e.g., where a fiber is strongly twisted or weaved (knitted) in a way a rough surface just like a crepe weave is obtained. However, the polylactic acid resin fiber according to the present embodiment is also capable of providing a crisp feeling without using these techniques.

The stretch recovery rate according to the present embodiment was measured as shown in the following. An initial load of 1/10 g of the nominal fineness was applied to a sample, and a small skein having a skein length of 40 cm and a winding count of 10 was prepared. A heavy load, which is 1/10 of the nominal fineness multiplied by 20 g, was applied to this skein, and the skein was immersed in water whose temperature was 20±2 degrees Celsius for three minutes. The skein length (1) was measured. Then, the heavy load was removed, and the skein was left for two minutes. Then, the skein length (m) was measured again, and the stretch recovery rate was calculated by the following equation.

Stretch recovery rate (%)=(1−$m$)/1×100

[Degree of Crystallinity of Polylactic Acid Resin Fiber]

Regarding the degree of crystallinity of a polylactic acid resin fiber according to the present embodiment, in a polylactic acid resin fiber obtained by melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C), the degree of crystallinity is preferably 50 to 70 percent. Also, in a polylactic acid resin fiber obtained by melt-spinning a mixture containing 100 parts by weight of a poly-L-lactic acid (A) having an L-lactic acid purity of 98 to 99 mol percent, 3 to 10 parts by weight of a plasticizer (B), and 0.3 to 1.0 parts by weight of a lubricant (C), the degree of crystallinity is preferably 40 to 60 percent. Poly-L-lactic acid is a semi-crystalline polymeric material in which a crystalline portion and a non-crystalline portion coexist. As long as the degree of crystallinity in this range is maintained, even when the temperature exceeds the glass transition temperature and the non-crystalline portion becomes rubbery and softened, there is almost no deformation of the polylactic acid resin fiber, and the polylactic acid resin fiber can withstand a high temperature that exceeds 100 degrees Celsius. The degree of crystallinity according to the present embodiment means the degree of crystallinity obtained by measuring a crystallization enthalpy ($\Delta Hc$) and a melting enthalpy ($\Delta Hm$) when the temperature of the polylactic acid resin composition is raised at a speed of 10° C./min using a differential scanning calorimeter (DSC) and performing a calculation according to the following equation.

Degree of crystallinity (%)=(melting enthalpy−crystallization enthalpy)/93×100

In a polylactic acid resin fiber obtained by melt-spinning a mixture containing 100 parts by weight of a poly-L-lactic acid (A), 3 to 10 parts by weight of a plasticizer (B), and 0.3 to 1.0 parts by weight of a lubricant (C) according to the present embodiment, two or more crystal melting peaks are observed that are measured by a differential scanning calorimeter. Further, the polylactic acid resin fiber preferably includes a melting peak of 160 degrees Celsius or less. The polylactic acid resin fiber according to the present embodiment is crystallized through rapid cooling down to a certain temperature from a molten state, drawing, and heating. A crystalline structure that is formed is a lamellar structure (folded chain crystal). At that time, the temperature under which the crystallization treatment is performed is the most basic and important factor in the high-order structure formation of a polymer. In other words, it is known that the thickness of a crystal increases as the crystallization temperature increases, and a crystal with a smaller lamellar thickness is formed when crystallization occurs at a lower temperature. Also, crystallization at a low temperature results in a disorder-type crystal where the crystalline structure of lactic acid is slightly disordered. The thinner the thickness of a lamellar becomes and the more disordered the crystalline structure becomes, the lower the melting temperature becomes. The composition and the construction method according to the present embodiment allow the mobility of the molecular chains to be increased, allowing for crystallization in a lower temperature range; thereby, the distribution of melting peaks is widened, a plurality of melting peaks including a melting peak on a low temperature side of 160 degrees Celsius or less is observed, the distribution of the thickness of the crystal and the distribution of the disorder in the crystalline structure are more widened, and a fiber having flexible extensibility can be formed while the polylactic acid resin fiber has high crystallinity and heat resistance.

[Moisture Percentage of Polylactic Acid Resin Fiber]

The moisture percentage of the polylactic acid resin fiber according to the present embodiment is preferably 1 to 5 percent. When the moisture percentage is less than 1 percent, frictional electrification is likely to occur. When electrification occurs, a single fiber repels another single fiber resulting in fiber opening or in being drawn toward peripheral members, causing the handling to be extremely difficult. Also, when the moisture percentage exceeds 5 percent, deterioration due to the hydrolysis of poly-L-lactic acid becomes an issue.

The polylactic acid resin fiber according to the present embodiment has a self-extinguishing property. Although the fiber burns when exposed to a flame, the fiber has a property of promptly extinguishing a flame once the fiber is away from the flame.

More specifically, the polylactic acid resin fiber according to the present embodiment is used as a multifilament, a staple fiber, a spunbond fabric, a monofilament, a flat yarn, or the like.

Further, for the cross-sectional shape of the polylactic acid resin fiber according to the present embodiment, a multilobed cross section such as a circular cross section, a hollow cross section, a trilobal cross section, etc., or a different modified cross section can be freely selected.

The polylactic acid resin fiber according to the present embodiment is preferably used for hygienic materials, construction materials, agricultural materials, living materials, and industrial materials. For example, the fiber can be suitably used not only for clothing such as original yarns, shirts, suits, jackets, pants, etc., but also for clothing materials such as cups, pads, etc., interior or vehicle interior such as curtains, carpets, mats, furniture, etc., industrial materials such as belts, nets, tents, ropes, heavy fabrics, bags, sewing threads, fishing lines, etc., and, furthermore, felts, unwoven fabrics, filters, artificial lawn, etc.

The polylactic acid resin fiber according to the present embodiment can be favorably dyed with natural dyes. Conventionally-used chemical fibers such as polyester fibers containing polylactic acid or polyethylene terephthalate, nylon fibers, etc., cannot be dyed with natural dyes since natural pigments do not become fixed on the fibers. In contrast, the polylactic acid resin fiber according to the present embodiment allows for dyeing using natural dyes, which is so-called plant dyeing. The polylactic acid resin fiber according to the present embodiment for which natural dyes can be used allows for color shades, tones of color, and designs that are non-conventional.

Major natural dyes that can be used for the dyeing of the polylactic acid resin fiber according to the present embodiment include madder, safflower, Lithospermum erythrorhizon, indigo, Miscanthus tinctorius, Amur cork, turmeric, Rhus chinensis, harlequin glorybower, nettles, Artemisia, persimmon tannin, etc. Other usable dyes that are of animal origin include Tyrian purple, sepia, cochineal, lac dye, etc.

The fiber is immersed in these dyes, which are liquids in which leaves, stems, roots, fruits, and the like are mainly decocted, and heated for approximately 20 minutes so that pigments that have been taken up become combined with metal ions so as to develop colors. Combining the pigments with metal ions is called mordanting, and the fiber is immersed for approximately 20 minutes in a liquid in which aluminum, copper, iron, etc., are dissolved. This allows for dyeing. By repeating immersion in a plant extract and mordanting, dyeing of the fiber with pigments is improved, and the depth of color can be increased.

Due to the effects of the existence of the plasticizer and the lubricant contained in the polylactic acid fiber according to the present embodiment, these natural dyes are stabilized in the fiber thus dyeing the fiber. The dyes do not flow out from the fiber even when washed.

Since the mixture containing 100 parts by weight of a poly-L-lactic acid (A), 3 to 10 parts by weight of a plasticizer (B), and 0.3 to 1.0 parts by weight of a lubricant (C) in the polylactic acid resin fiber according to the present embodiment is favorably mixed with a raw resin of an acrylic fiber or an acryl-based fiber, melt-spinning can be performed after the melt-mixing of these raw materials.

The main monomeric component in a raw resin of an acrylic fiber or an acryl-based fiber is acrylonitrile. Since a fiber is unlikely to be formed by acrylonitrile alone, a copolymer of vinyl chloride (chloroethylene), vinyl acetate, acrylic acid ester, methacrylic acid ester, or the like and acrylonitrile is used. Of these, particularly a raw resin containing acrylic acid ester or methacrylic acid ester is favorably mixed with the raw resin of the polylactic acid resin fiber according to the present embodiment and is therefore used suitably.

A polylactic acid resin fiber obtained by melt-mixing the mixture containing 100 parts by weight of a poly-L-lactic acid (A), 3 to 10 parts by weight of a plasticizer (B), and 0.3 to 1.0 parts by weight of a lubricant (C) in the polylactic acid resin fiber according to the present embodiment with the raw resin of an acrylic fiber or an acryl-based fiber followed by melt-spinning is lightweight, has a wool-like texture, and feels soft, bulky, and warm. Further, the fiber has a tensile property that is better than that of wool and is mainly produced in the form of a short fiber.

The mixing ratio of poly-L-lactic acid in the polylactic acid resin fiber obtained by melt-mixing the mixture containing 100 parts by weight of a poly-L-lactic acid (A), 3 to 10 parts by weight of a plasticizer (B), and 0.3 to 1.0 parts by weight of a lubricant (C) in the polylactic acid resin fiber according to the present embodiment with the raw resin of an acrylic fiber or an acryl-based fiber followed by melt-spinning is preferably 30 percent or more. When the mixing ratio is less than 30 percent, the polylactic acid is diluted, and crystallization is almost impossible. In other words, in the polylactic acid resin fiber obtained by melt-mixing the mixture containing 100 parts by weight of a poly-L-lactic acid (A), 3 to 10 parts by weight of a plasticizer (B), and 0.3 to 1.0 parts by weight of a lubricant (C) with the raw resin of an acrylic fiber or an acryl-based fiber followed by melt-spinning, it has been confirmed by a differential scanning calorimeter (DSC) that the poly-L-lactic acid in the polylactic acid resin fiber is not crystallized when the mixing ratio of the poly-L-lactic acid is less than 30 percent.

Exemplary Embodiments

Detailed description will be made below regarding the present invention based on exemplary embodiments. However, the present invention is by no means intended to be restricted to such exemplary embodiments. Also, manufacturing conditions and properties of a polylactic acid resin composition according to each of the following exemplary embodiments and comparative examples are shown in Tables 1 and 2.

First Exemplary Embodiment

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 150 degrees Celsius, and wound at 100d/24f so as to obtain a polylactic acid resin fiber.

The tensile strength of the obtained polylactic acid resin fiber was 3.77 cN/dtex and achieved a tensile strength of 3.5 cN/dtex or more as the tensile strength of a manufactured fiber, which is desirable in terms of the actual production. The extensibility was 34.3 percent, and the fiber was thus flexible enough. Further, the stretch recovery rate was 0.9 percent, and the fiber was thus extremely excellent in thermal dimensional stability. The degree of crystallinity measured by a differential scanning calorimeter was 51.2 percent, and two endothermic peaks that were based on crystal melting in a differential scanning thermal analysis curve were observed at 164.7 degrees Celsius and 157.8 degrees Celsius, respectively. The moisture percentage was 2.12 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Further, the flammability of this filament was checked. Although the filament burned when exposed to a flame, the flame was promptly extinguished in less than a second once the filament was away from the flame. In other words, the polylactic acid resin fiber according to the present exemplary embodiment has a self-extinguishing property.

Second Exemplary Embodiment

By kneading 100 parts by weight of poly-L-lactic acid (Ingeo Biopolymer: 4032D manufactured by NatureWorks LLC, L-lactic acid purity: 98 to 99 mol %), 10 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 220 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f so as to obtain a polylactic acid resin fiber.

The tensile strength of the obtained polylactic acid resin fiber was 3.6 cN/dtex and achieved a tensile strength of 3.5 cN/dtex or more as the tensile strength of a manufactured fiber, which is desirable in terms of the actual production. The extensibility was 37 percent, and the fiber was thus flexible enough. Further, the stretch recovery rate was 1.2 percent, and the fiber was thus extremely excellent in thermal dimensional stability. The degree of crystallinity measured by a differential scanning calorimeter was 43.6 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Third Exemplary Embodiment

By kneading 100 parts by weight of poly-L-lactic acid (Ingeo Biopolymer: 4032D manufactured by NatureWorks LLC, L-lactic acid purity: 98 to 99 mol %), 3 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 240 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 150 degrees Celsius, and wound at 100d/24f so as to obtain a polylactic acid resin fiber.

The tensile strength of the obtained polylactic acid resin fiber was 3.8 cN/dtex and achieved a tensile strength of 3.5 cN/dtex or more as the tensile strength of a manufactured fiber, which is desirable in terms of the actual production. The extensibility was 31 percent, and the fiber was thus flexible enough. Further, the stretch recovery rate was 0.8 percent, and the fiber was thus extremely excellent in thermal dimensional stability. The degree of crystallinity measured by a differential scanning calorimeter was 41.6 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

First Comparative Example

By kneading 100 parts by weight of poly-L-lactic acid (Ingeo Biopolymer: 4032D manufactured by NatureWorks LLC, L-lactic acid purity: 98 to 99 mol %), 12 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 220 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f so as to obtain a polylactic acid resin fiber. However, since there was yarn breakage trouble, e.g., when coming into contact with a heater at the time of the drawing, the fiber was not able to become a stable spun yarn. The degree of crystallinity of the obtained polylactic acid resin fiber measured by a differential scanning calorimeter was 32.1 percent. It is considered that, due to low heat resistance, yarn breakage was produced when the fiber came into contact with a heater at the time of the drawing.

Second Comparative Example

By kneading 100 parts by weight of poly-L-lactic acid (Ingeo Biopolymer: 4032D manufactured by NatureWorks LLC, L-lactic acid purity: 98 to 99 mol %), 2.5 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 240 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f. However, since there was yarn breakage trouble, e.g., when coming into contact with a heater at the time of the drawing, a stable spun yarn was not able to be obtained. The degree of crystallinity of the obtained polylactic acid resin fiber measured by a differential scanning calorimeter was 27.8 percent. It is considered that, due to low heat resistance, yarn breakage was produced when the fiber came into contact with a heater at the time of the drawing.

Fourth Exemplary Embodiment

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.3 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f so as to obtain a polylactic acid resin fiber.

The tensile strength of the obtained polylactic acid resin fiber was 3.6 cN/dtex and achieved a tensile strength of 3.5 cN/dtex or more as the tensile strength of a manufactured fiber, which is desirable in terms of the actual production. The extensibility was 33.3 percent, and the fiber was thus flexible enough. Further, the stretch recovery rate was 1.2 percent, and the fiber was thus extremely excellent in thermal dimensional stability. The degree of crystallinity measured by a differential scanning calorimeter was 46.4 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 1.0 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f so as to obtain a polylactic acid resin fiber.

The tensile strength of the obtained polylactic acid resin fiber was 3.7 cN/dtex and achieved a tensile strength of 3.5 cN/dtex or more as the tensile strength of a manufactured fiber, which is desirable in terms of the actual production. The extensibility was 32.3 percent, and the fiber was thus flexible enough. Further, the stretch recovery rate was 0.8 percent, and the fiber was thus extremely excellent in thermal dimensional stability. The degree of crystallinity measured by a differential scanning calorimeter was 58.8 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Third Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.2 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 220 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f. However, since there was yarn breakage trouble, e.g., when coming into contact with a heater at the time of the drawing, a stable spun yarn was not able to be obtained. The degree of crystallinity of the obtained polylactic acid resin fiber measured by a differential scanning calorimeter was 30.5 percent. It is considered that, due to low heat resistance, yarn breakage was produced when the fiber came into contact with a heater at the time of the drawing.

Fourth Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 1.2 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 220 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 130 degrees Celsius, and wound at 100d/24f. However, since there was yarn breakage trouble, e.g., when coming into contact with a heater at the time of the drawing, a stable spun yarn was not able to be obtained. The degree of crystallinity of the obtained polylactic acid resin fiber measured by a differential scanning calorimeter was 62.45 percent. It is considered that, since the fiber became rigid due to crystallinity being too high resulting in the loss of flexibility, yarn breakage was produced when the fiber came into contact with a heater at the time of the drawing.

Fifth Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-60002 manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 120 degrees Celsius, and wound at 100d/24f so as to obtain a polylactic acid resin fiber.

The tensile strength of the obtained polylactic acid resin fiber was 3.7 cN/dtex, and the extensibility was 35 percent. Thus, the fiber was flexible enough. However, the stretch recovery rate was 6.3 percent, and the degree of crystallinity measured by a differential scanning calorimeter was 35.6 percent. Therefore, it was not possible to prepare a polylactic acid resin fiber excellent in crystallinity, i.e., heat resistance and thermal dimensional stability.

Sixth Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-60000 manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2.3 times larger by a roller heater of 120 degrees Celsius, drawn to be 1.2 times larger and heat-fixed by a plate heater of 170 degrees Celsius, and wound at 100d/24f. As a result of this, the resin became too soft in the plate heater for the heat-fixing, and there was trouble such as fusing. Also, with regard to a polylactic acid resin fiber that was obtained, the degree of crystallinity measured by a differential scanning calorimeter was quite low being 25.4 percent. Therefore, it was not possible to prepare a polylactic acid resin fiber excellent in crystallinity, i.e., heat resistance.

Sixth Exemplary Embodiment

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 1.0 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 4 times larger by a roller heater of 120 degrees Celsius, drawn to be 2.5 times larger and heat-fixed by a plate heater of 150 degrees Celsius, and wound at 100d/24f so as to obtain a polylactic acid resin fiber.

The tensile strength of the obtained polylactic acid resin fiber was 3.6 cN/dtex and achieved a tensile strength of 3.5 cN/dtex or more as the tensile strength of a manufactured fiber, which is desirable in terms of the actual production. The extensibility was 32.0 percent, and the fiber was thus flexible enough. Further, the stretch recovery rate was 0.8 percent, and the fiber was thus extremely excellent in thermal dimensional stability. The degree of crystallinity measured by a differential scanning calorimeter was 59.8 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Seventh Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 4 times larger by a roller heater of 120 degrees Celsius, drawn to be 3 times larger and heat-fixed by a plate heater of 150 degrees Celsius, and wound at 100d/24f. As a result of this, since there was yarn breakage trouble, e.g., when coming into contact with a heater at the time of the drawing, a stable spun yarn was not able to be obtained. The draw ratio under the present conditions was 12 in total, and, due to too much drawing, a good spun yarn was not able to be obtained.

Eighth Comparative Example

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, drawn to be 2 times larger by a roller heater of 100 degrees Celsius, heat-fixed by a plate heater of 150 degrees Celsius, and wound at 100d/24f so as to obtain a polylactic acid resin fiber.

The tensile strength of the obtained polylactic acid resin fiber was 3.7 cN/dtex, and the extensibility was 34 percent. Thus, the fiber was flexible enough. However, the stretch recovery rate was 8.3 percent, and the degree of crystallinity measured by a differential scanning calorimeter was 26.4 percent. Since the draw ratio under the present conditions was low being 2, the fiber was not able to exhibit sufficient crystallization. Therefore, it was not possible to prepare a polylactic acid resin fiber excellent in heat resistance and thermal dimensional stability.

Seventh Exemplary Embodiment

A polylactic acid resin fiber was obtained using the same composition and conditions as those used for the first exemplary embodiment except for the use of 3.0 parts by weight of a caster oil-based fatty acid ester (Rick sizer: C-101 manufactured by Itoh Oil Chemicals Co., Ltd.) and 3.0 parts by weight of polyethylene glycol (PEG-6000P manufactured by Sanyo Chemical Industries, Ltd.) as plasticizers.

The tensile strength of the obtained polylactic acid resin fiber was 3.5 cN/dtex and achieved a tensile strength of 3.5 cN/dtex or more as the tensile strength of a manufactured fiber, which is desirable in terms of the actual production. The extensibility was 38.0 percent, and the fiber was thus flexible enough. Further, the stretch recovery rate was 2.5 percent, and the fiber was thus extremely excellent in thermal dimensional stability. The degree of crystallinity measured by a differential scanning calorimeter was 44.3 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Eighth Exemplary Embodiment

A polylactic acid resin fiber was obtained using the same composition and conditions as those used for the first exemplary embodiment except for the use of 0.53 parts by weight of an N-stearyl erucic acid amidmanufactured by Nippon Kasei Chemical Co., Ltd.) as a plasticizer.

The tensile strength of the obtained polylactic acid resin fiber was 3.8 cN/dtex and achieved a tensile strength of 3.5 cN/dtex or more as the tensile strength of a manufactured fiber, which is desirable in terms of the actual production. The extensibility was 33.0 percent, and the fiber was thus flexible enough. Further, the stretch recovery rate was 0.9 percent, and the fiber was thus extremely excellent in thermal dimensional stability. The degree of crystallinity measured by a differential scanning calorimeter was 49.3 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Ninth Exemplary Embodiment

A polylactic acid resin fiber was obtained using the same composition and conditions as those used for the first exemplary embodiment except for the use of 0.53 parts by weight of an N-stearyl stearic acid amide (NIKKA AMIDE S manufactured by Nippon Kasei Chemical Co., Ltd.) as a plasticizer.

The tensile strength of the obtained polylactic acid resin fiber was 3.8 cN/dtex and achieved a tensile strength of 3.5 cN/dtex or more as the tensile strength of a manufactured fiber, which is desirable in terms of the actual production. The extensibility was 34.0 percent, and the fiber was thus flexible enough. Further, the stretch recovery rate was 0.9 percent, and the fiber was thus extremely excellent in thermal dimensional stability. The degree of crystallinity measured by a differential scanning calorimeter was 47.3 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Tenth Exemplary Embodiment

By kneading 100 parts by weight of poly-L-lactic acid (Ingeo Biopolymer: 2500HP manufactured by NatureWorks LLC, L-lactic acid purity >99 mol %), 4.0 parts by weight of polyethylene glycol (PEG-6000P manufactured by Sanyo Chemical Industries, Ltd.) as a plasticizer, and 0.5 parts by weight of ethylene bis hydroxystearic acid amide (ITOH-WAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 99 mol percent or more, a plasticizer (B), and a lubricant (C) was obtained in a pellet form.

Then, the pellets were pushed out into the air through a spinning nozzle at a spinning temperature of 240 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 3 times larger by a roller heater of 120 degrees Celsius, drawn to be 3 times larger and heat-fixed by a plate heater of 160 degrees Celsius, and wound at 100d/24f so as to obtain a polylactic acid resin fiber.

The tensile strength of the obtained polylactic acid resin fiber was 3.8 cN/dtex and achieved a tensile strength of 3.5 cN/dtex or more as the tensile strength of a manufactured fiber, which is desirable in terms of the actual production. The extensibility was 31.5 percent, and the fiber was thus flexible enough. Further, the stretch recovery rate was 0.7 percent, and the fiber was thus extremely excellent in thermal dimensional stability. The degree of crystallinity measured by a differential scanning calorimeter was 64.7 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Eleventh Exemplary Embodiment

By kneading 100 parts by weight of poly-L-lactic acid (Ingeo Biopolymer: 4032D manufactured by NatureWorks LLC, L-lactic acid purity: 98 to 99 mol %), 56 parts by weight of polyethylene glycol (PEG-6000P manufactured by Sanyo Chemical Industries, Ltd.) as a plasticizer, and 10.7 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a condensed polylactic acid resin composition (D) containing a total of 66.7 parts by weight of a plasticizer (B) and a lubricant (C) based on 100 parts by weight of a poly-L-lactic acid (A) was obtained in a pellet form.

Then, pellets in which 87.5 parts by weight of poly-L-lactic acid (Ingeo Biopolymer: 4032D manufactured by NatureWorks LLC, L-lactic acid purity: 98 to 99 mol %) was mixed through a dry process with 12.5 parts by weight of this polylactic acid resin composition (D) were pushed out into the air through a spinning nozzle at a spinning temperature of 240 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 3 times larger by a roller heater of 120 degrees Celsius, drawn to be 2 times larger and heat-fixed by a plate heater of 150 degrees Celsius, and wound at 100d/24f so as to obtain a polylactic acid resin fiber.

The tensile strength of the obtained polylactic acid resin fiber was 3.7 cN/dtex and achieved a tensile strength of 3.5 cN/dtex or more as the tensile strength of a manufactured fiber, which is desirable in terms of the actual production. The extensibility was 32.6 percent, and the fiber was thus flexible enough. Further, the stretch recovery rate was 0.9 percent, and the fiber was thus extremely excellent in thermal dimensional stability. The degree of crystallinity measured by a differential scanning calorimeter was 50.3 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Twelfth Exemplary Embodiment

By kneading 60 parts by weight of poly-L-lactic acid (Ingeo Biopolymer: 4032D manufactured by NatureWorks LLC, L-lactic acid purity: 98 to 99 mol %), 40 parts by weight of poly-L-lactic acid (Ingeo Biopolymer: 2003D manufactured by NatureWorks LLC, L-lactic acid purity <98 mol %), 84 parts by weight of polyethylene glycol (PEG-6000P manufactured by Sanyo Chemical Industries, Ltd.) as a plasticizer, and 16 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a condensed polylactic acid resin composition (D) containing a total of 100 parts by weight of a plasticizer (B) and a lubricant (C) based on 100 parts by weight of a poly-L-lactic acid (A) containing poly-L-lactic acid having an L-lactic acid purity of 98 mol % or less was obtained in a pellet form.

Then, pellets in which 90 parts by weight of poly-L-lactic acid (Ingeo Biopolymer: 2500HP manufactured by NatureWorks LLC, L-lactic acid purity >99 mol %) was mixed through a dry process with 10 parts by weight of this polylactic acid resin composition (D) were pushed out into the air through a spinning nozzle at a spinning temperature of 240 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 3 times larger by a roller heater of 120 degrees Celsius, drawn to be 3 times larger and heat-fixed by a plate heater of 150 degrees Celsius, and wound at 100d/24f so as to obtain a polylactic acid resin fiber.

The tensile strength of the obtained polylactic acid resin fiber was 3.6 cN/dtex and achieved a tensile strength of 3.5 cN/dtex or more as the tensile strength of a manufactured fiber, which is desirable in terms of the actual production. The extensibility was 32.8 percent, and the fiber was thus flexible enough. Further, the stretch recovery rate was 0.9 percent, and the fiber was thus extremely excellent in thermal dimensional stability. The degree of crystallinity measured by a differential scanning calorimeter was 51.9 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus a good filament.

Thirteenth Exemplary Embodiment

By kneading 100 parts by weight of poly-L-lactic acid (Ingeo Biopolymer: 4032D manufactured by NatureWorks LLC, L-lactic acid purity: 98 to 99 mol %), 4.7 parts by weight of polyethylene glycol (PEG-6000P manufactured by Sanyo Chemical Industries, Ltd.) as a plasticizer, and 0.53 parts by weight of ethylene bis hydroxystearic acid amide (ITOHWAX: J-530 manufactured by Itoh Oil Chemicals Co., Ltd.) as a lubricant using a twin-screw extrusion kneading machine under a cylinder temperature of 160 to 180 degrees Celsius, a mixture containing a poly-L-lactic acid (A) having an L-lactic acid purity of 98 to 99 mol percent, a plasticizer (B), and a lubricant (C) was obtained in a pellet form.

Then, the pellets were pushed out into the air through a spinning nozzle at a spinning temperature of 230 degrees Celsius after being dried under reduced pressure for 7 hours at 80 degrees Celsius, passed through a taking-up roll and a roller heater heated at 80 degrees Celsius after being passed through quench air of 14 degrees Celsius, heat-drawn to be 2 times larger by a roller heater of 120 degrees Celsius, and drawn to be 2 times larger and heat-fixed by a plate heater of 150 degrees Celsius so as to obtain a long polylactic acid resin fiber. A crimping process and a cutting process were further performed on the long polylactic acid resin fiber obtained so as to obtain a short polylactic acid resin fiber.

The stretch recovery rate of the polylactic acid resin fiber obtained was 0.9 percent, and the fiber was thus extremely excellent in thermal dimensional stability. The degree of crystallinity measured by a differential scanning calorimeter was 51.8 percent, and two endothermic peaks that were based on crystal melting in a differential scanning thermal analysis curve were observed at 164 degrees Celsius and 158 degrees Celsius, respectively. The moisture percentage was 2.2 percent. The polylactic acid resin fiber according to the present exemplary embodiment had good heat resistance and was a good spun yarn without causing any trouble such as yarn breakage, e.g., when coming into contact with a heater at the time of the drawing. Also, the polylactic acid resin fiber obtained was flexible and excellent in strength, crystallinity, i.e., heat resistance, and thermal dimensional stability and was thus good staple.

Fourteenth Exemplary Embodiment

A "Sukumo" dye (dye made of fermented indigo leaves), which is a raw material used for Aidate (indigo dye liquid preparation), is dissolved in an alkaline aqueous solution and reduced by the action of microorganisms so as to allow the indigo to dissolve into an aqueous solution in a bottle. After the polylactic acid fiber obtained in the first exemplary embodiment was soaked in this solution, the polylactic acid fiber was taken out and dried. This allowed the polylactic acid fiber to be dyed blue through oxidation. The dyeability was extremely good.

TABLE 1

| | POLY-L-LACTIC ACID (A) | | | PLASTICIZER | | LUBRICANT | |
|---|---|---|---|---|---|---|---|
| | PURITY | (INGEO BIOPOLYMER) | PARTS BY WEIGHT | | PARTS BY WEIGHT | | PARTS BY WEIGHT |
| FIRST EXEMPLARY EMBODIMENT | 98-99 mol % | 4032D | 100 | PEG-6000G | 4.7 | ITOHWAX: J-530 | 0.53 |
| SECOND EXEMPLARY EMBODIMENT | 98-99 mol % | 4032D | 100 | PEG-6000G | 10.0 | ITOHWAX: J-530 | 0.53 |
| THIRD EXEMPLARY EMBODIMENT | 98-99 mol % | 4032D | 100 | PEG-6000G | 3.0 | ITOHWAX: J-530 | 0.53 |
| FIRST COMPARATIVE EXAMPLE | 98-99 mol % | 4032D | 100 | PEG-6000G | 12.0 | ITOHWAX: J-530 | 0.53 |
| SECOND COMPARATIVE EXAMPLE | 98-99 mol % | 4032D | 100 | PEG-6000G | 2.5 | ITOHWAX: J-530 | 0.53 |
| FOURTH EXEMPLARY EMBODIMENT | 98-99 mol % | 4032D | 100 | PEG-6000G | 4.7 | ITOHWAX: J-530 | 0.30 |

TABLE 1-continued

| | POLY-L-LACTIC ACID (A) | | | PLASTICIZER | | LUBRICANT | |
|---|---|---|---|---|---|---|---|
| | PURITY | (INGEO BIOPOLYMER) | PARTS BY WEIGHT | | PARTS BY WEIGHT | | PARTS BY WEIGHT |
| FIFTH EXEMPLARY EMBODIMENT | 98-99 mol % | 4032D | 100 | PEG-6000G | 4.7 | ITOBWAX: J-530 | 1.00 |
| THIRD COMPARATIVE EXAMPLE | 98-99 mol % | 4032D | 100 | PEG-6000G | 4.7 | ITOHWAX: J-530 | 0.20 |
| FOURTH COMPARATIVE EXAMPLE | 98-99 mol % | 4032D | 100 | PEG-6000G | 4.7 | ITOHWAX: J-530 | 1.20 |
| FIFTH COMPARATIVE EXAMPLE | 98-99 mol % | 4032D | 100 | PEG-6000G | 4.7 | ITOBWAX: J-530 | 0.53 |
| SIXTH COMPARATIVE EXAMPLE | 98-99 mol % | 4032D | 100 | PEG-6000G | 4.7 | ITOHWAX: J-530 | 0.53 |
| SIXTH EXEMPLARY EMBODIMENT | 98-99 mol % | 4032D | 100 | PEG-6000G | 4.7 | ITOHWAX: J-530 | 1.00 |
| SEVENTH COMPARATIVE EXAMPLE | 98-99 mol % | 4032D | 100 | PEG-6000G | 4.7 | ITOHWAX: J-530 | 0.53 |
| EIGHTH COMPARATIVE EXAMPLE | 98-99 mol % | 4032D | 100 | PEG-6000G | 4.7 | ITOHWAX: J-530 | 0.53 |
| SEVENTH EXEMPLARY EMBODIMENT | 98-99 mol% | 4032D | 100 | RICK SIZER: C-101<br>PEG-6000G | 3.0<br>3.0 | ITOHWAX: J-530 | 0.53 |
| EIGHTH EXEMPLARY EMBODIMENT | 98-99 mol % | 4032D | 100 | PEG-6000G | 4.7 | NIKKA AMIDE SE | 0.53 |
| NINTH EXEMPLARY EMBODIMENT | 98-99 mol % | 4032D | 100 | PEG-6000G | 4.7 | NIKKA AMIDE S | 0.53 |
| TENTH EXEMPLARY EMBODIMENT | >99 mol % | 2500HP | 100 | PEG-6000G | 4.0 | ITOHWAX: J-530 | 0.50 |
| ELEVENTH EXEMPLARY EMBODIMENT | 98-99 mol %<br>98-99 mol % | 4032D (A)<br>4032D | 100<br>8705 | PEG-6000G<br>(D) = (A) + (B) + (C) | 56.0<br>12.5 | ITOHWAX: J-530 (C) | 10.70 |
| TWELFTH EXEMPLARY EMBODIMENT | 98-99 mol %<br><98 mol %<br>>99 mol % | 4032D (A)<br>2003D (A)<br>2500HP | 60<br>40<br>90 | PEG-6000G (B)<br>(D) = (A) + (B) + (C) | 84.0<br>10.0 | ITOHWAX: J-530 (C) | 16.00 |
| THIRTEENTH EXEMPLARY EMBODIMENT | 98-99 mol % | 4032D | 100 | PEG-6000G | 4.7 | ITOHWAX: J-530 | 0.53 |

TABLE 2

| | CYLINDER | | | DRAWING PROCESS | | | | STRETCH | | | |
|---|---|---|---|---|---|---|---|---|---|---|---|
| | TEMPERATURE KNEADING [° C.] | PELLET DRYING | SPINNING TEMPERATURE [° C.] | DRAWING 1 (° C.*RATIO) | DRAWING 2 (° C.*RATIO) | HEAT FIXATION [° C.] | TENSILE STRENGTH [CN/DTEX] | EXTENSIBILITY [%] | RECOVERY RATE [%] | DEGREE OF CRYSTALLINITY [%] | MOISTURE PERCENTAGE [%] |
| FIRST EXEMPLARY EMBODIMENT | 160-180 | 80° C.-7 h | 230 | 120 * 2.3 | 150 * 1.2 | 150 | 3.77 | 34.3 | 0.9 | 51.2 | 2.12 |
| SECOND EXEMPLARY EMBODIMENT | 160-180 | 80° C.-7 h | 220 | 120 * 2.3 | 130 * 1.2 | 130 | 3.60 | 37.0 | 1.2 | 43.6 | — |
| THIRD EXEMPLARY EMBODIMENT | 160-180 | 80° C.-7 h | 240 | 120 * 2.3 | 150 * 1.2 | 150 | 3.80 | 31.0 | 0.8 | 41.6 | — |
| FIRST COMPARATIVE EXAMPLE | 160-180 | 80° C.-7 h | 220 | 120 * 2.3 | 130 * 1.2 | 130 | — | — | — | 32.1 | — |
| SECOND COMPARATIVE EXAMPLE | 160-180 | 80° C.-7 h | 240 | 120 * 2.3 | 130 * 1.2 | 130 | — | — | — | 27.8 | — |
| FOURTH EXEMPLARY EMBODIMENT | 160-180 | 80° C.-7 h | 230 | 120 * 2.3 | 130 * 1.2 | 130 | 3.60 | 33.3 | 1.2 | 46.4 | — |
| FIFTH EXEMPLARY EMBODIMENT | 160-180 | 80° C.-7 h | 230 | 120 * 2.3 | 130 * 1.2 | 130 | 3.70 | 32.3 | 0.8 | 58.8 | — |
| THIRD COMPARATIVE EXAMPLE | 160-180 | 80° C.-7 h | 220 | 120 * 2.3 | 130 * 1.2 | 130 | — | — | — | 30.5 | — |
| FOURTH COMPARATIVE EXAMPLE | 160-180 | 80° C.-7 h | 220 | 120 * 2.3 | 130 * 1.2 | 130 | — | — | — | 62.45 | — |
| FIFTH COMPARATIVE EXAMPLE | 160-180 | 80° C.-7 h | 230 | 120 * 2.3 | 170 * 1.2 | 170 | 3.70 | 35.0 | 6.3 | 35.6 | — |
| SIXTH COMPARATIVE EXAMPLE | 160-180 | 80° C.-7 h | 230 | 120 * 4 | 150 * 2.5 | 120 | — | — | — | 25.4 | — |
| SIXTH EXEMPLARY EMBODIMENT | 160-180 | 80° C.-7 h | 230 | 120 * 4 | 150 * 3 | 150 | 3.60 | 32.0 | 0.8 | 59.8 | — |
| SEVENTH COMPARATIVE EXAMPLE | 160-180 | 80° C.-7 h | 230 | 120 * 2 | — | 150 | — | — | — | — | — |
| EIGHTH COMPARATIVE EXAMPLE | 160-180 | 80° C.-7 h | 230 | 120 * 2.3 | 150 * 1.2 | 150 | 3.70 | 34.0 | 8.3 | 26.4 | — |
| SEVENTH EXEMPLARY EMBODIMENT | 160-180 | 80° C.-7 h | 230 | 120 * 2.3 | 150 * 1.2 | 150 | 3.50 | 38.0 | 2.5 | 44.3 | — |
| EIGHTH EXEMPLARY EMBODIMENT | 160-180 | 80° C.-7 h | 240 | 120 * 2.3 | 150 * 1.2 | 150 | 3.80 | 33.0 | 0.9 | 49.3 | — |
| NINTH EXEMPLARY EMBODIMENT | 160-180 | 80° C.-7 h | 240 | 120 * 2.3 | 150 * 1.2 | 150 | 3.80 | 34.0 | 0.9 | 47.3 | — |
| TENTH EXEMPLARY EMBODIMENT | 160-180 | 80° C.-7 h | 230 | 120 * 3 | 160 * 3 | 160 | 3.80 | 31.5 | 0.7 | 64.7 | — |
| ELEVENTH EXEMPLARY EMBODIMENT | 160-180 | 80° C.-7 h | 240 | 120 * 3 | 150 * 2 | 150 | 3.70 | 32.6 | 0.9 | 50.3 | — |
| TWELFTH EXEMPLARY EMBODIMENT | 160-180 | 80° C.-7 h | 240 | 120 * 3 | 150 * 3 | 150 | 3.60 | 32.8 | 0.9 | 51.9 | — |
| THIRTEENTH EXEMPLARY EMBODIMENT | 160-180 | 80° C.-7 h | 230 | 120 * 2 | 150 * 2 | 150 | — | — | 0.9 | 51.8 | 2.2 |

[Method for Manufacturing Polylactic Acid Resin Fiber]

(1) One embodiment of a method for manufacturing a polylactic acid resin fiber according to the present embodiment includes a process of melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C). Also, the polylactic acid resin fiber obtained satisfies the following conditions (a) and (b):

(a) the stretch recovery rate is 5 percent or less; and (b) the degree of crystallinity measured by a differential scanning calorimeter is 50 to 70 percent.

(2) Another embodiment of the method for manufacturing a polylactic acid resin fiber according to the present embodiment includes a process of melt-spinning a mixture containing 100 parts by weight of a poly-L-lactic acid (A) having an L-lactic acid purity of 98 to 99 mol percent, 3 to 10 parts by weight of a plasticizer (B), and 0.3 to 1.0 parts by weight of a lubricant (C). Also, the polylactic acid resin fiber obtained satisfies the following conditions (c) and (d):

(c) the stretch recovery rate is 5 percent or less; and (d) the degree of crystallinity measured by a differential scanning calorimeter is 40 to 60 percent.

The above-stated melt-spinning process is preferably performed by a direct spinning and drawing method, and the heat fixation temperature after hot drawing is preferably 130 to 160 degrees Celsius.

Further, the above-stated melt-spinning process is preferably performed by a direct spinning and drawing method, spinning is preferably performed at 200 to 250 degrees Celsius, drawing is preferably performed at 70 to 130 degrees Celsius and at a draw ratio of 2 to 10, and heat treatment is preferably performed at 130 to 160 degrees Celsius.

Also, a method for manufacturing a polylactic acid resin composition may further include a process of preparing, in advance, a condensed polylactic acid resin composition (D) obtained by kneading a total of 25 to 100 parts by weight of the plasticizer (B) and the lubricant (C) based on 100 parts by weight of the poly-L-lactic acid (A) in order to prepare the mixture containing the poly-L-lactic acid (A), the plasticizer (B), and the lubricant (C). The condensed polylactic acid resin composition (D) may further contain poly-L-lactic acid having an L-lactic acid purity of 98 mol percent or less.

INDUSTRIAL APPLICABILITY

The polylactic acid resin fiber according to the present embodiment is excellent in operability and fiber physical properties. In other words, a fiber can be obtained that is excellent in heat resistance being free of a decrease in spinnability that is caused due to heat deterioration, causes no yarn breakage, and is excellent in physical properties of strength, extensibility, and a stretch recovery rate.

The invention claimed is:

1. A polylactic acid resin fiber obtained by melt-spinning a mixture containing 100 parts by weight of a poly-L-lactic acid (A) having an L-lactic acid purity of 99 mol percent or more, 3 to 10 parts by weight of a plasticizer (B), and 0.3 to 1.0 parts by weight of a lubricant (C), wherein the following conditions (a) and (b) are satisfied:

(a) the stretch recovery rate is 5 percent or less; and (b) the degree of crystallinity measured by a differential scanning calorimeter is 50 to 70 percent.

2. A polylactic acid resin fiber obtained by melt-spinning a mixture containing 100 parts by weight of a poly-L-lactic acid (A) having an L-lactic acid purity of 98 to 99 mol percent, 3 to 10 parts by weight of a plasticizer (B), and 0.3 to 1.0 parts by weight of a lubricant (C), wherein the following conditions (c) and (d) are satisfied:

(c) the stretch recovery rate is 5 percent or less; and (d) the degree of crystallinity measured by a differential scanning calorimeter is 40 to 60 percent.

3. The polylactic acid resin fiber according to claim 2, wherein two or more endothermic peaks that are based on crystal melting in a differential scanning thermal analysis (DSC) curve are observed including an endothermic peak that is based on crystal melting at 160 degrees Celsius or less.

4. The polylactic acid resin fiber according to claim 1, wherein the melt-spinning is performed by a direct spinning and drawing method, and wherein the heat fixation temperature after hot drawing is 130 to 160 degrees Celsius.

5. The polylactic acid resin fiber according to claim 1, wherein the melt-spinning is performed by a direct spinning and drawing method, and wherein the polylactic acid resin fiber is obtained by performing spinning at 200 to 250 degrees Celsius, performing drawing at 70 to 130 degrees Celsius and at a draw ratio of 2 to 10, and performing heat treatment at 130 to 160 degrees Celsius.

6. The polylactic acid resin fiber according to claim 1, wherein the plasticizer (B) is at least one compound selected from the group consisting of a polyethylene glycol, a caster oil-based fatty acid ester, a polyoxyethylene sorbitan fatty acid ester, and a polyethylene glycol fatty acid ester or a mixture thereof.

7. The polylactic acid resin fiber according to claim 1, wherein the plasticizer (B) is polyethylene glycol having a molecular weight of 200 to 9500.

8. The polylactic acid resin fiber according to claim 1, wherein the lubricant (C) is at least one compound selected from the group consisting of an ethylene-bis-hydroxy stearic acid amide, an N-stearyl erucic acid amide, an N-stearyl stearic acid amide, an ethylene-bis-stearic acid amide, and a stearic acid amide or a mixture thereof.

9. The polylactic acid resin fiber according to claim 1, satisfying a condition where the moisture percentage is 1 to 5 percent.

10. The polylactic acid resin fiber according to claim 1, wherein, prior to melt-spinning the mixture containing the poly-L-lactic acid (A), the plasticizer (B), and the lubricant (C), a condensed polylactic acid resin composition (D) is first prepared by kneading a total of 25 to 100 parts by weight of the plasticizer (B) and the lubricant (C) based on 100 parts by weight of the poly-L-lactic acid (A) to obtain the composition (D), and then the mixture containing the poly-L-lactic acid (A), the plasticizer (B), and the lubricant (C) is melt-spun.

11. The polylactic acid resin fiber according to claim 10, wherein the condensed polylactic acid resin composition (D) further contains poly-L-lactic acid having an L-lactic acid purity of 98 mol percent or less.

12. A polylactic acid long fiber comprising the polylactic acid resin fiber according to claim 1.

13. A polylactic acid short fiber comprising the polylactic acid resin fiber according to claim 1.

14. A polylactic acid fiber obtained by dyeing the polylactic acid resin fiber according to claim 1 using a natural dye.

* * * * *